US012795592B2

(12) United States Patent
Zhu et al.

(10) Patent No.: US 12,795,592 B2
(45) Date of Patent: Nov. 10, 2026

(54) ENHANCED DEVICE TYPING IN A NETWORK USING Wi-Fi SENSE DATA AND MOVEMENT SIGNATURES

(71) Applicant: PLUME DESIGN, INC., Palo Alto, CA (US)

(72) Inventors: Tingyi Zhu, Mountain View, CA (US); Ha Do, Cumming, GA (US); Richard Chang, Los Altos Hills, CA (US); Charles Kring, Sunnyvale, CA (US); Sean Li, Campbell, GA (US); Timothy Nguyen, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 246 days.

(21) Appl. No.: 18/804,726

(22) Filed: Aug. 14, 2024

(65) Prior Publication Data

US 2025/0063537 A1 Feb. 20, 2025

Related U.S. Application Data

(60) Provisional application No. 63/520,222, filed on Aug. 17, 2023.

(51) Int. Cl.

| | |
|---|---|
| ***H04W 64/00*** | (2009.01) |
| ***H04B 7/06*** | (2006.01) |
| ***H04B 17/318*** | (2015.01) |

(52) U.S. Cl.

CPC .......... *H04W 64/00* (2013.01); *H04B 7/0626* (2013.01); *H04B 17/318* (2015.01)

(58) Field of Classification Search

CPC ... H04W 64/00; H04B 7/0626; H04B 7/0632; H04B 17/318

See application file for complete search history.

(56) References Cited

U.S. PATENT DOCUMENTS

| | | | | |
|---|---|---|---|---|
| 11,393,037 | B1 * | 7/2022 | Fields | G05B 19/042 |
| 2014/0300506 | A1 * | 10/2014 | Teter | G01S 7/415 342/104 |
| 2020/0292715 | A1 * | 9/2020 | Farnham | G01S 13/003 |
| 2020/0364721 | A1 * | 11/2020 | Pickering | G06F 21/32 |

FOREIGN PATENT DOCUMENTS

| | | | | |
|---|---|---|---|---|
| GB | 2548738 | A * | 9/2017 | G06Q 40/08 |

* cited by examiner

*Primary Examiner* — Siu M Lee

(74) *Attorney, Agent, or Firm* — Nicholas Martin; Greenberg Traurig, LLP

(57) ABSTRACT

In some implementations, the techniques described herein relate to a method including: collecting, by a processor, Wi-Fi sense data (WSD) associated with a client device in a network, wherein the WSD includes wireless characteristics indicative of one of a movement or position of the client device; generating, by the processor, a movement signature for the client device based on the WSD; classifying, by the processor, a fine-grained type of the client device utilizing the movement signature; and storing, by the processor, the fine-grained type in a storage device.

20 Claims, 5 Drawing Sheets

ENHANCED DEVICE TYPING IN A NETWORK USING Wi-Fi SENSE DATA AND MOVEMENT SIGNATURES

CROSS-REFERENCE TO RELATED APPLICATIONS

This application claims the benefit of priority from U.S. Provisional Application No. 63/520,222, filed on Aug. 17, 2023, which is incorporated by reference in its entirety herein.

BACKGROUND

Numerous wireless networks utilize device categorization to execute application-centric tasks such as device administration, automation, and the like. Contemporary strategies often resort to semi-automated categorizations supplemented by manual human editing of device types. However, these methodologies carry inherent limitations in their scope of application, exhibit a susceptibility to errors, and do not offer a robust solution for accurately typing wireless devices.

DETAILED DESCRIPTION

Figure 1:
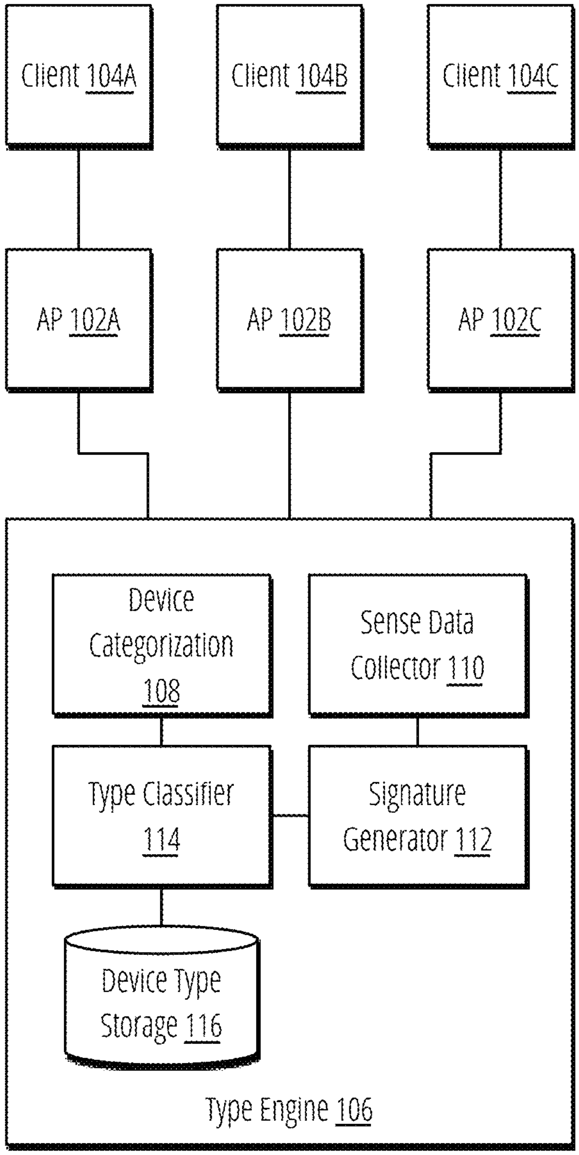
FIG. 1 is a block diagram illustrating a Wi-Fi sense data system for device type identification according to some of the example embodiments.

The example embodiments solve the technical problems related to improving the accuracy of device categorization in a wireless network environment, particularly when devices exhibit similar networking behaviors, thereby making it difficult to discern their precise type or category using only network data.

The example embodiments describe a system and method for collecting Wi-Fi sense data (WSD) related to the movement characteristics of client devices in a wireless network. This data is then processed and used to generate unique movement signatures for each device. These signatures, along with broad device categories, if available, are then used to make a fine-grained classification of each device. This solution can be further enhanced by using either a rules-based approach or a machine learning-based approach for generating movement signatures and for classifying devices. The technical effect of the example embodiments is an improved accuracy of device classification, especially in cases where devices exhibit similar networking behaviors, and a better understanding of the unique characteristics of each device in the network. The solution also provides a mechanism to differentiate devices that were previously hard to type, thus enhancing the overall intelligence of network management systems.

The example embodiments include collecting WSD, processing such data, generating movement signatures, and performing fine-grained classification, which are far beyond the capabilities of manual calculation or computation using existing techniques. The level of data collection, particularly from multiple client devices, along with the subsequent need for data processing, requires advanced computational capabilities described herein. The generating of unique movement signatures based on this data, as well as the classification tasks, involve complex calculations, potentially including machine learning models or heuristic algorithms. These tasks require high-speed processing and data handling capacities that are impossible to replicate with traditional methods. Consequently, the proposed method clearly necessitates the use of the example embodiments.

In some implementations, the techniques described herein relate to a method including: collecting, by a processor, Wi-Fi sense data (WSD) associated with a client device in a network, wherein the WSD includes wireless characteristics indicative of one of a movement or position of the client device; generating, by the processor, a movement signature for the client device based on the WSD; classifying, by the processor, a fine-grained type of the client device utilizing the movement signature; and storing, by the processor, the fine-grained type in a storage device.

In some implementations, the techniques described herein relate to a method, wherein the WSD includes one or more of Channel State Information (CSI), Channel Frequency Response (CFR), Received Signal Strength Indicator (RSSI), and Time of Arrival (ToA).

In some implementations, the techniques described herein relate to a method, further including capturing the WSD from communications between the client device and one or more access points in the network.

In some implementations, the techniques described herein relate to a method, wherein generating the movement signature includes applying a rule-based algorithm to the WSD.

In some implementations, the techniques described herein relate to a method, wherein generating the movement signature includes applying a machine learning algorithm to the WSD, the machine learning algorithm having been trained on a dataset including known movement signatures corresponding to different types of client devices.

In some implementations, the techniques described herein relate to a method, wherein generating the movement signature includes aggregating the WSD over a defined period of time to represent movements of the client device within the defined period of time.

In some implementations, the techniques described herein relate to a method, wherein classifying the fine-grained type of the client device includes applying a set of predefined rules that correlate movement signatures to device types.

In some implementations, the techniques described herein relate to a method, wherein classifying the fine-grained type of the client device includes using a machine learning model that has been trained on a dataset of known device types and their corresponding movement signatures to predict the fine-grained type based on the movement signature.

In some implementations, the techniques described herein relate to a method, further including: categorizing, by the processor, the client device into a category based on network traffic data; and utilizing, by the processor, the category in addition to the movement signature to classify the fine-grained type of the client device.

In some implementations, the techniques described herein relate to a non-transitory computer-readable storage medium for tangibly storing computer program instructions capable of being executed by a computer processor, the computer program instructions defining steps of: collecting, by the computer processor, Wi-Fi sense data (WSD) associated with a client device in a network, wherein the WSD includes wireless characteristics indicative of one of a movement or position of the client device; generating, by the computer processor, a movement signature for the client device based on the WSD; classifying, by the computer processor, a fine-grained type of the client device utilizing the movement signature; and storing, by the computer processor, the fine-grained type in a storage device.

In some implementations, the techniques described herein relate to a non-transitory computer-readable storage medium, wherein the WSD includes one or more of Channel State Information (CSI), Channel Frequency Response (CFR), Received Signal Strength Indicator (RSSI), and Time of Arrival (ToA).

In some implementations, the techniques described herein relate to a non-transitory computer-readable storage medium, wherein generating the movement signature includes one of applying a rule-based algorithm to the WSD or applying a machine learning algorithm to the WSD, the machine learning algorithm having been trained on a dataset including known movement signatures corresponding to different types of client devices.

In some implementations, the techniques described herein relate to a non-transitory computer-readable storage medium, wherein generating the movement signature includes aggregating the WSD over a defined period of time to represent movements of the client device within the defined period of time.

In some implementations, the techniques described herein relate to a non-transitory computer-readable storage medium, wherein classifying the fine-grained type of the client device includes one of applying a set of predefined rules that correlate movement signatures to device types or using a machine learning model that has been trained on a dataset of known device types and their corresponding movement signatures to predict the fine-grained type based on the movement signature.

In some implementations, the techniques described herein relate to a non-transitory computer-readable storage medium, further including: categorizing, by the processor, the client device into a category based on network traffic data; and utilizing, by the processor, the category in addition to the movement signature to classify the fine-grained type of the client device.

In some implementations, the techniques described herein relate to a device including: a processor; and a storage medium for tangibly storing thereon logic for execution by the processor, the logic including instructions for: collecting Wi-Fi sense data (WSD) associated with a client device in a network, wherein the WSD includes wireless characteristics indicative of one of a movement or position of the client device, generating a movement signature for the client device based on the WSD, classifying a fine-grained type of the client device utilizing the movement signature, and storing the fine-grained type in a storage device.

In some implementations, the techniques described herein relate to a device, wherein generating the movement signature includes one of applying a rule-based algorithm to the WSD or applying a machine learning algorithm to the WSD, the machine learning algorithm having been trained on a dataset including known movement signatures corresponding to different types of client devices.

In some implementations, the techniques described herein relate to a device, wherein classifying the fine-grained type of the client device includes one of applying a set of predefined rules that correlate movement signatures to device types or using a machine learning model that has been trained on a dataset of known device types and their corresponding movement signatures to predict the fine-grained type based on the movement signature.

In some implementations, the techniques described herein relate to a device, the instructions further including: categorizing the client device into a category based on network traffic data; and utilizing the category in addition to the movement signature to classify the fine-grained type of the client device.

FIG. 1 is a block diagram illustrating a Wi-Fi sense data system for device type identification according to some of the example embodiments.

In an implementation, a system includes a plurality of client devices (e.g., client device 104A, client device 104B, and client device 104C) communicatively coupled to access point (AP) devices (e.g., AP 102A, AP 102B, AP 102C). The AP devices may be communicated to other networking hardware (not illustrated) such as switches, routers, modems, etc. and form a Wi-Fi network in an environment (e.g., house, office, etc.). As illustrated, the AP devices may be communicatively coupled to type engine 106. In some implementations, type engine 106 can analyze data related to the various client devices and assign a type to each device. In some implementations, the type can be a category or sub-category that places the client devices in a taxonomy of wireless devices. Type engine 106 includes a device categorization stage 108 that broadly categorizes a device based on its network traffic. Type engine 106 also includes a sense data collector 110 that collects raw Wi-Fi sense data (WSD) regarding the client devices and, in some implementations, processes the raw WSD to a format suitable for downstream processing. Type engine 106 includes a signature generator 112 that receives WSD (either raw or processed) and computes a signature for a given device based on the WSD. This signature can represent the movement characteristics or other aspects of a client device based on the WSD. Type engine 106 includes type classifier 114. In some implementations, type classifier 114 receives a signature from signature generator 112 as well as a category from device categorization stage 108 and computes a fine-grained type or sub-category for the device. In some implementations, type classifier 114 can comprise a machine learning (ML) model while in other embodiments a rule-based classifier may be used. Finally, type engine 106 includes a device type storage device 116, such as a database, or long-term storage of device type data for each client device.

In some implementations, type engine 106 may be implemented at various locations in the system. For example, type engine 106 can be implemented in an AP, in a network device (e.g., switch, router, modem, etc.) or in a remote server (e.g., in a cloud implementation). In some implementations, some features or modules of type engine 106 may be distributed. For example, device categorization stage 108, sense data collector 110, and signature generator 112 may be distributed to APs or to a network device; by contrast, type classifier 114 and device type storage device 116 may be implemented in a centralized manner (e.g., in a remote data center).

In the illustrated environment, the system includes a plurality of client devices including client device 104A, client device 104B, and client device 104C. The client devices may be any type of Wi-Fi-enabled devices commonly found in homes, offices, or other environments where wireless connectivity is required. The client devices can include, but are not limited to, personal computers, laptops, smartphones, tablets, smart TVs, smart home devices like thermostats or light systems, IoT sensors, security cameras, or other Wi-Fi-enabled electronic devices. Each of the client devices may support one or more communication protocols, such as various IEEE 802.11 protocols (described herein). The client devices may also include additional features, such as multi-band capabilities, different power saving modes, and security features, among others. These client devices connect to the Wi-Fi network by establishing a wireless connection with one or more APs (e.g., AP 102A, AP 102B, AP 102C) within range, in order to communicate with other devices within the network or to access services available on the Internet.

As illustrated, the client devices are communicatively coupled to access points including, but not limited to, AP 102A, AP 102B, and AP 102C. These APs provide Wi-Fi connectivity and data transmission within the network. They can function as standalone devices or be integrated within larger network infrastructures such as routers or network switches. APs are typically dispersed strategically within the environment, offering coverage over defined areas to ensure optimal connectivity for all client devices. APs are capable of managing multiple concurrent connections from various client devices and adhere to a range of communication protocols such as IEEE 802.11. Each AP can provide dual or multi-band capabilities to cater to various devices and applications, often operating within the 2.4 GHz and 5 GHz frequency bands. APs can also be equipped with robust security features such as WEP, WPA, or WPA2 protocols to maintain data integrity and confidentiality within the network. Advanced features such as beamforming may also be incorporated to enhance signal quality and device connectivity.

In an implementation, type engine 106 receives data from the APs (and thus from client devices). In some implementations, the data includes network data which is used by device categorization stage 108 to provide a high-level categorization of the type of any given client device. This data, often a multitude of digital readings reflecting various characteristics of the network interaction, forms the initial basis of device categorization. In some implementations, the data includes network data which is used by device categorization stage 108 to provide a high-level categorization of the type of any given client device. Network data may encompass the type and volume of packets sent, network endpoints contacted, device-specific communication protocols, or MAC addresses, among other elements. The device categorization stage 108 uses this network data to categorize devices into broad groups, such as smartphones, laptops, IoT devices, or other categories.

In some implementations, ML classification can be used to classify data based on the network data. Such models may be trained using a training dataset of network data and known categorizations and any type of suitable classification algorithm can be used such as Random Forest or Gradient Boosting trees. On the other hand, for high-dimensional data with linear separability, Support Vector Machines could be a suitable choice. Deep learning approaches, like Convolutional Neural Networks (CNNs) or Recurrent Neural Networks (RNNs), might also be used for their superior ability to learn complex patterns and handle large amounts of data. The specific choice of ML algorithm is not limited. Further, in some embodiments, a rule-based approach can be used wherein specific network data can be pre-classified and then detected, wherein devices exhibiting unknown data can be categorized as "unknown."

Device categorization stage 108 can be run as needed to perform device categorization. In some implementations, sense data collector 110 can also be executed in parallel and as needed.

Sense data collector 110 can receive WSD from the wireless network. WSD includes data such as Channel State Information (CSI), Channel Frequency Response (CFR), Received Signal Strength Indicator (RSSI), and Time of Arrival (ToA), among others. CSI and CFR data provide insights into how the Wi-Fi signal changes as it propagates through the environment, indicating the presence and movement of Wi-Fi devices. RSSI and CSI data offers information about the signal strength at the receiver, which can also suggest device proximity. ToA data, conversely, provides the timing of signal arrival, offering additional movement-related insights.

In some implementations, sense data collector 110 can aggregate WSD over a period of time to more accurately represent movements of the corresponding client device. This time-aggregated approach captures a more comprehensive view of a device's behavior, considering not just instantaneous measurements, but trends and patterns over time. Aggregating data over time allows the system to discern continuous or repetitive movement patterns that might be indicative of specific device categories. For instance, the periodic motion data of a wearable device like a smartwatch will differ significantly from that of a stationary device such as a smart TV. Moreover, this temporal data aggregation helps the system distinguish between random noise and genuine device motion, thus improving the reliability of the motion signatures generated. By considering how signal characteristics change over extended periods, the system can mitigate the effects of transient disturbances, enhancing the overall accuracy of the device identification process.

The transmission of WSD from a client device to the sense data collector 110 follows a sequence of steps and involves multiple components within the system. When a client device, such as a smartphone or a smart TV, interacts with the Wi-Fi network (either by moving within the network's range or by actively sending/receiving data), it impacts the characteristics of the Wi-Fi signals within that network. This impact is captured as WSD. The APs, such as AP 102A, 102B, and 102C, that are in communication with the client devices, capture this WSD. These APs then transmit the captured WSD through the network to type engine 106 and the sense data collector 110 specifically. Depending on implementation, this transmission can be direct, or it might pass through other networking hardware like switches or routers. The sense data collector 110, upon receiving the WSD, begins its process of aggregating and preparing the data for downstream processing and analysis.

To generate a comprehensive movement signature, the raw WSD captured by the sense data collector 110 may be pre-processed. This pre-processing can include transforming the raw data into a format that is suitable for the subsequent signature generation and can reveal the underlying movement patterns of the client device. Pre-processing may involve filtering out the noise in the raw data. Since Wi-Fi signals can be influenced by a range of factors in their environment, such as other electronic devices, physical obstacles, and even atmospheric conditions, the raw WSD may contain extraneous noise that can be eliminated for accurate analysis. Next, the data may be normalized to ensure uniformity and comparability across different measurements and devices. This normalization process could involve scaling the data or converting it into a certain standard format. In some implementations, the sense data collector 110 might also apply feature extraction techniques to identify and isolate the most relevant aspects of the WSD for movement detection. This could involve time-series analysis, Fourier transforms, or other mathematical methods that can highlight the significant patterns in the data. In some implementations, an ML-based dimensionality reduction approach, such as principal component analysis (PCA), can be used. Finally, the processed data could be segmented into specific time windows or epochs. These segments can represent the movement patterns of the device over consistent, comparable periods, providing a basis for the generation of a time-dependent movement signature in the signature generator 112. In some implementations, signature generator 112 may perform some or all of the foregoing steps of pre-processing.

As illustrated, signature generator 112 can receive the processed WSD from sense data collector and use the processed WSD to generate a movement signature for the client device associated with the WSD. Leveraging the refined and structured form of the processed WSD, the signature generator 112 can utilize advanced algorithms or ML models to derive a unique movement signature for the associated client device. The movement signature encapsulates the patterns and behaviors observed in the processed WSD, effectively translating these movements into a digital representation. This could involve interpreting the frequency, intensity, and duration of movement patterns, or recognizing sequences of movements that form a characteristic signature. Each device type's movement signature will be reasonably distinct, given the unique way different types of devices interact with the wireless network. For example, the movement signature of a smartphone, which is often in motion as carried by a user, will be significantly different from a stationary IoT device like a smart refrigerator. These movement signatures are not static but may evolve over time, reflecting changes in the device's interaction patterns with the Wi-Fi network. This dynamic nature of the signatures allows the system to adapt to new movement patterns, providing up-to-date and accurate device typing information.

One approach to generate movement signatures from processed Wi-Fi sense data (WSD) involves a heuristic or rules-based system. Under this approach, the signature generator 112 could apply a set of predefined rules that correlate specific patterns in the WSD with certain device types. For instance, a rule might be that if the CSI values remain relatively constant over a given period (suggesting no movement), the device might be classified as a stationary type, like a smart refrigerator or a connected home security camera. Another rule might be that frequent changes in CSI values (indicating continuous motion) might correspond to a mobile device, such as a smartphone or wearable device. The rules could be fine-tuned or expanded based on empirical data or expert knowledge to cover a wide range of device types and behaviors.

Alternatively, a machine learning-based approach could be employed to generate movement signatures, which offers increased flexibility and adaptability than rule-based methods. One specific type of model that could be used is a Recurrent Neural Network (RNN), particularly a Long Short-Term Memory (LSTM) model, which is designed to handle sequential data and is effective in identifying patterns over time. In this case, the processed WSD, which represents a sequence of wireless measurements over time, can be input into the LSTM model. The LSTM would then learn to recognize patterns and dependencies in the data sequence that relate to the movement characteristics of the device. This learned information would be encapsulated in a unique movement signature output by the model for each device. The advantage of this approach is its ability to adapt to new patterns and device behaviors as it continues to learn from more data over time.

In either approach, a movement signature is output by the signature generator 112. As illustrated, type classifier 114 receives both the categorization of the device generated by device categorization stage 108 as well as the signature generated by signature generator 112. Using these two vectors, type classifier 114 can predict a fine-grained type of the device.

Using these two vectors of information, type classifier 114 can provide a more detailed and precise classification of the device. Type classifier can apply a machine learning model or a rule-based system to evaluate the provided inputs and determine a more refined, or "fine-grained," device type. This could involve subdividing broad categories into more specific ones based on the movement signature. For example, a general category of "mobile devices" could be broken down into "smartphones," "tablets," and "wearables," each identified by their distinct movement signatures. Through this combined approach, the type classifier 114 can provide a more nuanced and accurate device type, enhancing the system's ability to understand and interact with the various devices within the network.

In a heuristic system, each broad category (and, in some implementations, a combination of category and manufacturer) can be broken down into several sub-categories, each associated with a movement signature. For instance, a general category such as "mobile devices" could be split into sub-categories like "smartphones," "tablets," and "wearables." Each of these sub-categories would be associated with a unique movement signature that characterizes its typical behavior within the Wi-Fi network. A smartphone, for example, might have a movement signature representing frequent and diverse movements as the user carries it throughout the home, while a wearable like a fitness tracker might show a pattern of periodic movement interspersed with periods of stationary behavior when the user is inactive. In some implementations, the device's manufacturer can also be factored into the categorization process. For instance, devices from different manufacturers might exhibit slightly different movement patterns due to variations in their Wi-Fi chips or software. These nuances can be captured in the movement signature, and the system can consider the combination of device category, manufacturer, and movement signature when assigning a final device type. The use of such heuristics allows the system to break down the broad categorizations into finer, more precise classifications. By associating each sub-category with a distinct movement signature, the system can achieve a detailed and comprehensive understanding of the diverse devices in the network.

Alternatively, or in conjunction with the foregoing, an ML-based approach can be applied to achieve more dynamic and adaptable device typing. This method entails training a predictive machine learning model with a dataset comprising known combinations of device categories and their corresponding movement signatures.

A variety of predictive machine learning models can be employed for this task, such as Support Vector Machines (SVM), Random Forest, Neural Networks, or Gradient Boosting algorithms. For instance, a Supervised Learning model can be trained on a dataset where each entry consists of a device's high-level category, its movement signature, and the corresponding fine-grained device type. The model would learn the relationships between these features in the training data, allowing it to predict the fine-grained device type for new instances based on their category and movement signature. In the case of neural networks, particularly deep learning models, these could provide even higher accuracy due to their ability to learn complex patterns and dependencies in the data. These models can be particularly effective when working with high-dimensional data such as movement signatures. The advantage of this ML-based approach is its ability to adapt and improve over time as it continues to learn from new data. This enables type classifier 114 to keep up with evolving device behaviors and new types of devices entering the network, ensuring that the device typing remains accurate and up-to-date.

In yet another implementation, a large language model (LLM) or similar generative model can be used to classify category and movement signatures. Here, the movement signatures can be post-processed to be in text format (e.g., as narrative statements) and can be fed into a prompt generator along with the category to generate an LLM prompt. The signature transformation could involve expressing the movement signatures as narrative statements or descriptions that encapsulate the device's behavior within the Wi-Fi network. For instance, a movement signature might be translated into a statement like "Device frequently moves between multiple rooms during daytime hours and remains stationary in the living room in the evenings." Once the movement signatures are in a text format, they can be fed into a prompt generator along with the high-level device category. The prompt generator then constructs a suitable prompt for the LLM, essentially framing the classification problem in a manner that the language model can understand. An example of a generated prompt might be: "Given that a device is categorized as a 'mobile device' and it frequently moves between multiple rooms during the day but remains stationary in the living room in the evenings, what would be its fine-grained device type?" The LLM then processes this prompt and generates a prediction of the fine-grained device type. The strength of this approach lies in the LLM's ability to understand and interpret complex patterns in textual data, making it a powerful tool for categorizing devices based on the narrative descriptions of their movement signatures.

In some implementations, type classifier 114 can operate solely on signatures output by signature generator 112. In such an implementation, device categorization stage 108 may be omitted to generate a fine-tuned device type.

Finally, after obtaining a fine-grained type, type engine 106 can store the fine-grained type and category in device type storage device 116. The device type storage device 116 may be a database, a distributed storage system, or any suitable storage medium that can maintain and manage a large volume of data. This storage not only facilitates retrieval and referencing of the device types for various operational needs within the network but also aids in maintaining a historical record of the types of devices that have interacted with the network. This historical data can be leveraged for further analysis and improvements in the system, such as refining the device typing process or tracking the evolution of device behavior patterns over time. Moreover, storing the fine-grained type and category information can be useful in enhancing the overall intelligence and efficiency of the network. For instance, the stored information can be used to optimize network performance for different types of devices, to ensure secure and appropriate access permissions based on device types, or to provide personalized experiences tailored to specific device behaviors. In this way, the comprehensive device type data stored in the device type storage device 116 contributes significantly to the overall function and performance of the smart home system. Further, in some implementations, the data in device type storage device 116 can be used as training data (after verification by an operator) for other networks or users.

Figure 2:
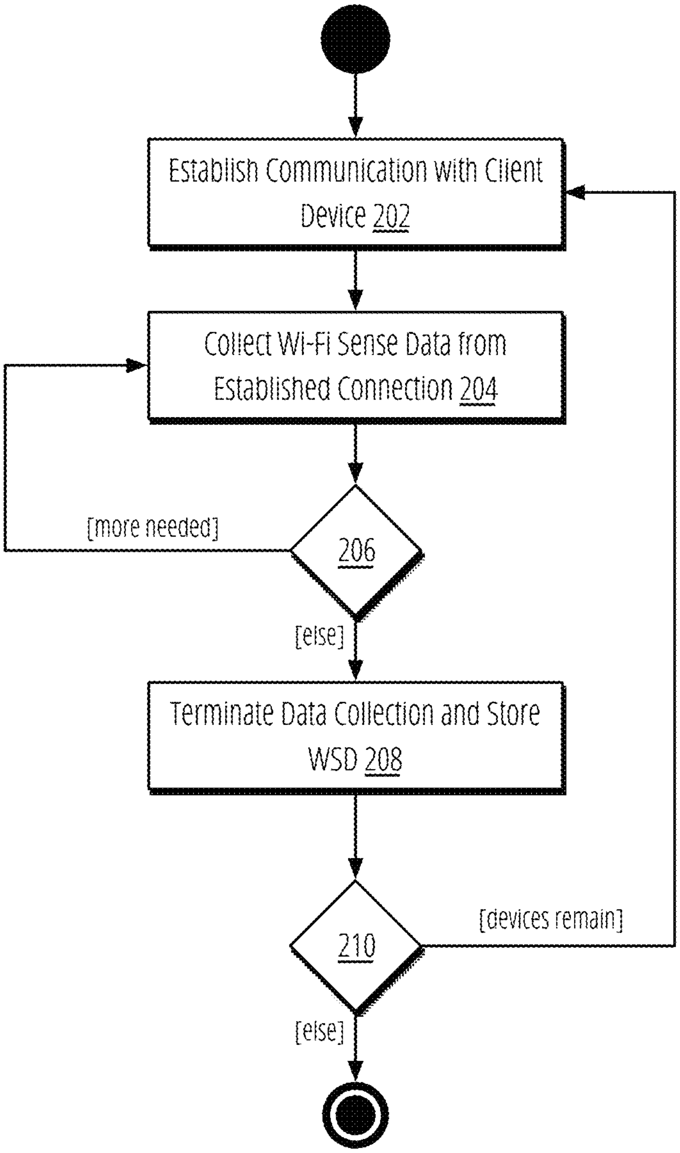
FIG. 2 is a flow diagram illustrating a method for device detection and Wi-Fi sense data capture according to some of the example embodiments.

FIG. 2 is a flow diagram illustrating a method for device detection and Wi-Fi sense data capture according to some of the example embodiments.

In step 202, the method can include establishing communication with a particular client device.

In some implementations, step 202 may include initializing a connection via a wireless network, leveraging an AP to interact with the device. The AP can be any device that allows wireless devices to connect to a wired network using Wi-Fi, or related standards. The AP serves as a central transmitter and receiver of wireless radio signals. The client devices may include a broad range of wireless-enabled devices such as smartphones, laptops, smart home devices, IoT devices, or any other devices capable of communicating over a wireless network. The connection with each client device is initialized one at a time to ensure accurate and unambiguous data collection.

Establishing the communication may involve several substeps such as scanning for available devices connected to the AP, sending connection requests, and receiving acknowledgments from the client device. In cases where the AP and the client device are within a wireless network's coverage area, they can connect and communicate without issue. The quality of communication, which can directly impact the quality of the captured WSD, might be influenced by various factors like the distance between the client device and the AP, the number of obstacles in the signal's path, and the presence of other interfering signals.

In some embodiments, this step may also involve selecting a particular client device based on certain criteria, such as signal strength, device type, or device status. For instance, preference may be given to devices that have stronger signals or are currently active on the network. Additionally, it may also involve managing and adjusting network parameters to optimize the quality and reliability of the established communication.

The process of establishing communication between the access point and the client device can leverage a variety of standard wireless communication protocols. The most common protocol for this interaction is Wi-Fi, based on the IEEE 802.11 family of standards. Wi-Fi protocols define the rules for how wireless devices communicate over the airwaves, including frequency bands, channel widths, modulation schemes, and other necessary parameters. Depending on the specific device and network configuration, different versions of the Wi-Fi standard may be used, such as 802.11n, 802.11ac, or 802.11ax (also known as Wi-Fi 6). These variants offer different features and capabilities, affecting the speed, range, and robustness of the wireless connection. Other wireless communication protocols may also be used in some implementations, such as Bluetooth, Zigbee, or LTE. Regardless of the specific protocol used, the aim is to establish a reliable communication channel that enables the effective collection of Wi-Fi sense data from the client device.

In step 204, the method can include collecting WSD from the established communication.

In some implementations, the WSD can include various types of data, including Received Signal Strength Indicator (RSSI), Channel State Information (CSI), Time of Arrival (ToA), Time Difference of Arrival (TDoA), Angle of Arrival (AoA), or Phase Difference of Arrival (PDoA), etc. These measurements capture different aspects of the Wi-Fi signal, such as its strength and quality, and can provide valuable insights into the behavior of the client device. These measurements give further insights into the location and orientation of the client device, providing spatial and temporal context to the captured data.

During this data collection phase, the access point communicates with the client device, updating and refreshing its capture of WSD. This ongoing collection allows for a dynamic and up-to-date dataset, reflecting the real-time movements and actions of the client device. This high-resolution data capture provides the basis for the subsequent data processing and device typing stages of the method.

In the process of data collection, the access point and the client device can communicate using various protocols, typically part of the IEEE 802.11 family. During this communication, WSD can be extracted from the communication packets exchanged between the access point and the client device. For instance, the RSSI can be derived from the power level of the received signal, a value that is typically included in the metadata of the Wi-Fi packet. Similarly, CSI can be obtained by analyzing the channel field in the header of the Wi-Fi packet, which provides information on the state of the Wi-Fi channel used for the communication. ToA, TDoA, AoA, and PDoA data can be extracted by analyzing the timing and direction of the Wi-Fi signals received from the client device.

In step 206, the method can include determining if sufficient data has been captured from the current device. If the data is insufficient, the method loops back to step 204, repeating the data capture until the required quantity and quality of data are met.

In some implementations, the determination of whether the quality or quantity of WSD collected can be tailored to meet specific requirements and can be influenced by factors such as the type of device, the device's movement patterns, the communication protocol used, and the specifics of the environment in which the device is operating.

In some implementations, WSD collection can occur over a variable time period, depending on the application's requirements. For some devices, a snapshot of Wi-Fi sense data collected over a short duration (e.g., milliseconds) may provide sufficient insight into the device's movements. For instance, a sudden change in RSSI may indicate a significant movement, which could be captured in a short timeframe. However, for other devices, a more extended data collection period might be needed to accurately capture the device's movement patterns. For example, an IoT device that only moves occasionally throughout the day may require data collection over several hours or even a full day to capture a representative sample of its movement behavior. In some implementations, the time period may be dynamically determined based on a categorization of the device based on network data (described above). By providing the flexibility to adjust the data collection duration, the method can accommodate a wide range of device types and movement patterns, enhancing the accuracy of device typing.

In step 208, the method can include terminating data collection with the current device once sufficient data has been gathered and storing the WSD. The access point can disengage from the client device and prepare to communicate with the next device, if any.

Storage can occur in multiple locations based on the system architecture and requirements. For instance, each AP could have a local storage cache where the collected WSD is initially stored. This local caching can allow for quick and efficient data collection, especially in scenarios involving multiple APs communicating with several client devices concurrently. This approach can also reduce network congestion as the raw data does not need to be immediately transferred to a centralized location. However, for the subsequent data processing and analysis, it might be desirable to aggregate the collected WSD in a central location, such as a cloud-based server or a local networking device (e.g., switch, gateway, modem, router, etc.). This centralized storage location allows for consolidated data processing, using algorithms to categorize the devices, generate movement signatures, and ultimately classify the device type (described next). Centralizing the Wi-Fi sense data also enables improved data management, backup, and security measures. Thus, step 208 may include one or both of immediate data storage at the AP level for efficient data collection and later storage in a centralized location for further processing and analysis.

In step 210, the method can include identifying if any other client devices remain to be analyzed. If so, the method selects the next client device and repeats step 202 through step 208. If all candidate client devices have been analyzed, the method ends.

To ensure comprehensive coverage of all devices within the wireless network, a scanning process can be implemented prior to the data collection. Scanning may include actively or passively searching for client devices that are within their range of a given AP and are capable of establishing a connection. This process can generate a list of candidate client devices that can respond and potentially provide WSD. Active scanning may involve the AP broadcasting a probe request frame, to which client devices respond with a probe response. This two-way interaction allows the AP to identify active and responsive devices in the network. Passive scanning, on the other hand, may involve the AP listening for beacon frames broadcast by client devices, without actively initiating any requests. This can identify client devices that are within range and are actively transmitting data. Based on the scanning results, the AP can create a list of candidate client devices. During step 210, the method checks if there are any remaining devices in this list that have not yet been analyzed. If so, it will select the next client device from the list and return to step 202 to repeat the process. If all candidate client devices have been analyzed, the method ends.

The above method provides a thorough and systematic approach to capturing WSD from all possible client devices in the network, thereby enhancing the accuracy and reliability of the device typing process and ensuring a robust and complete representation of an environment.

Figure 3:
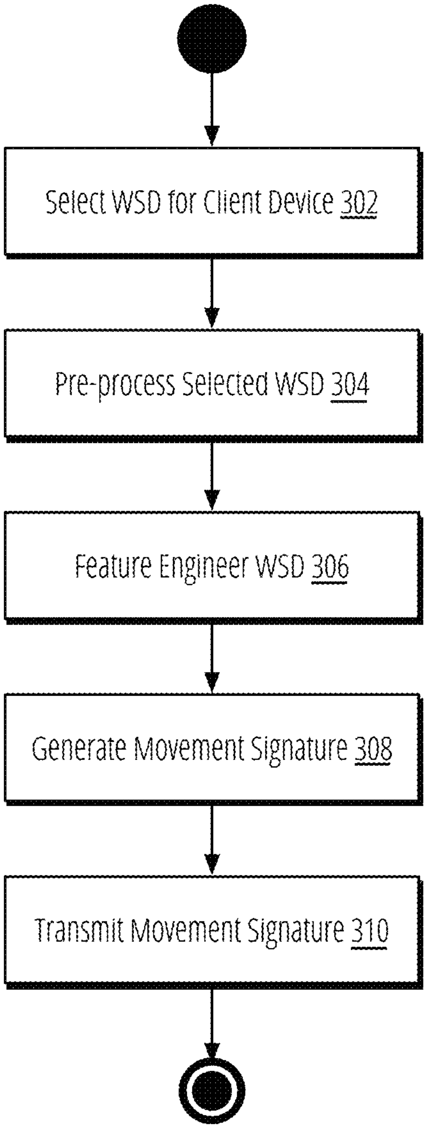
FIG. 3 is a flow diagram illustrating a method for processing Wi-Fi sense data according to some of the example embodiments.

FIG. 3 is a flow diagram illustrating a method for processing WSD according to some of the example embodiments.

In step 302, the method can include selecting WSD associated with a given client device from a database or other collection of WSD for an environment.

Selecting the WSD in step 302 can involve selecting WSD associated with a given client device from a database or other collection of WSD for an environment. This selection process can involve querying a database or retrieving data from a designated storage location. For example, given the specific identifiers of a client device such as a Media Access Control (MAC) address, the corresponding WSD can be retrieved for further processing. The storage could contain WSD related to various client devices present in the network. This data, typically collected in step 210 of the previous method, may be stored in a structured manner allowing efficient selection of the relevant WSD for each client device. This structured data organization can facilitate a streamlined process for identifying and retrieving data for the individual client devices, thereby reducing computational overhead and improving the efficiency of the method.

In step 304, the method can include pre-processing the WSD to remove data anomalies or inconsistent data. In some implementations, pre-processing can encompass multiple stages such as handling missing values, removing outliers, and noise reduction.

For example, the WSD could have occasional missing values due to intermittent connectivity issues or hardware limitations. These missing values can be handled by using statistical imputation methods, for instance, replacing them with mean, median, or mode values of the relevant data features. In some implementations, the method can include identifying and removing outliers. Outliers in WSD can distort the understanding of the underlying patterns and result in misclassifications. Therefore, outlier detection techniques such as Z-score or interquartile range (IQR) methods can be employed to identify and filter out such data points. In some implementations, the pre-processing can further include smoothing, signal processing, or computing moving averages to yield a cleaner and more meaningful data set for subsequent processing.

In step 306, the method can include performing feature engineering on the raw WSD to obtain one or more feature vectors representing the WSD during a given time period. In some implementations, the feature engineering phase can generate processible vectors for a downstream ML algorithm or heuristic algorithm. For instance, some of the raw WSD such as signal strength or channel state information may be transformed into other features like peak signal strength, average signal strength, variance of signal strength, or even spectral features that might be more informative for subsequent stages of the system. In general, aggregation of data across time to generate a single feature vector may be used to condense the raw WSD to processible vectors.

Alternatively, or in conjunction with the foregoing, the method can include segmenting the WSD into windows of a specific duration. Each window might be represented as a separate feature vector, allowing the system to capture changes in the WSD over time. For example, a window might capture the average or peak RSSI within that period, or the number of changes in signal strength exceeding a certain threshold.

In step 308, the method can include generating a movement signature using the feature vector(s) as inputs.

In some implementations, a movement signature is a unique representation of the movements or motion-related characteristics of a client device, derived from the WSD. In essence, the movement signature serves as a fingerprint of a device's behavior as perceived through its Wi-Fi interactions within the network. This is beneficial for at least two reasons.

First, different types of devices typically exhibit distinct patterns of movement or motion-related behaviors. For instance, a smartphone might show a lot of movement as it's carried around, while a Wi-Fi enabled thermostat would be stationary. Even among mobile devices, different usage patterns can create distinctive movement signatures. For example, a wearable fitness tracker might display high-frequency motion patterns when the wearer is exercising, while a laptop might only show movement when it's being set up or packed away.

Second, movement signatures can provide a much richer set of information for device identification compared to traditional network data alone. While network data can offer some insights into device type based on network protocols or communication patterns, adding movement signatures into the mix provides another dimension of data that can be leveraged for more accurate and fine-grained device identification.

As discussed, the movement signature can be generated using the feature vector and using either a heuristic or ML-based approach.

In a first implementation, a heuristic approach to generating a movement signature from the engineered feature vectors can utilize with a set of pre-defined rules or patterns. In this approach, each rule or pattern corresponds to a particular type of movement or behavior, which is known to be associated with a certain category of devices. For instance, a rule might specify that if the feature vector indicates frequent and rapid changes in the RSSI or CSI values, this could point to a mobile device such as a smartphone or a tablet being moved around a lot. Alternatively, a rule might indicate that a low variability in the RSSI or CSI values over a long period of time may correspond to a stationary device, such as a smart home hub or a Wi-Fi connected appliance.

In a heuristic system, the feature vectors can then be processed against these rules or patterns. Depending on the match between the features and the rules, a movement signature is generated. For example, if the feature vector matches the rules for a mobile device, the movement signature could be a series of alphanumeric characters or a binary code representing "mobile." On the other hand, if the feature vector matches the rules for a stationary device, a different signature representing "stationary" would be generated. In some implementations, the heuristic approach does not require extensive computational resources and can be efficiently implemented, making it a feasible option for environments with limited processing capabilities. However, the accuracy and the granularity of device identification using the heuristic approach depend on the comprehensiveness and the precision of the rules or patterns defined.

Alternatively, an ML-based approach can be used to generate a movement signature from the engineered feature vectors. In this approach, an ML model is trained to map feature vectors to corresponding movement signatures. This can be done by feeding the model a training dataset that includes feature vectors along with their correct movement signatures (i.e., the labels). The model learns the underlying patterns or correlations between the features and the movement signatures. After training, the model can predict the movement signature for a new, unseen feature vector.

One type of ML model that may be used is a Random Forest classifier. This ensemble learning model operates by constructing multiple decision trees during training and outputting the class that is the mode of the classes output by individual trees. This model is well suited to this task because it can handle high-dimensional data, can model complex decision boundaries, and provides a measure of "importance" for each feature, helping to understand which features are most influential in predicting the movement signatures. Moreover, deep learning models, such as CNNs or RNNs, could also be employed for this task. For instance, an RNN, particularly a variant like LSTM, could be used to capture temporal dependencies in the Wi-Fi sense data, that is, how the device's movement and signal strength change over time. In all of these cases, the ML model's output for a given feature vector is a prediction of the movement signature.

In step 310, the method can include transmitting the movement signature to a device typing model. This transmission might involve sending the movement signature over a network to a remote server where the typing model is hosted, or it could mean passing the movement signature to another part of the same software system or application if the typing model is hosted locally.

Figure 4:
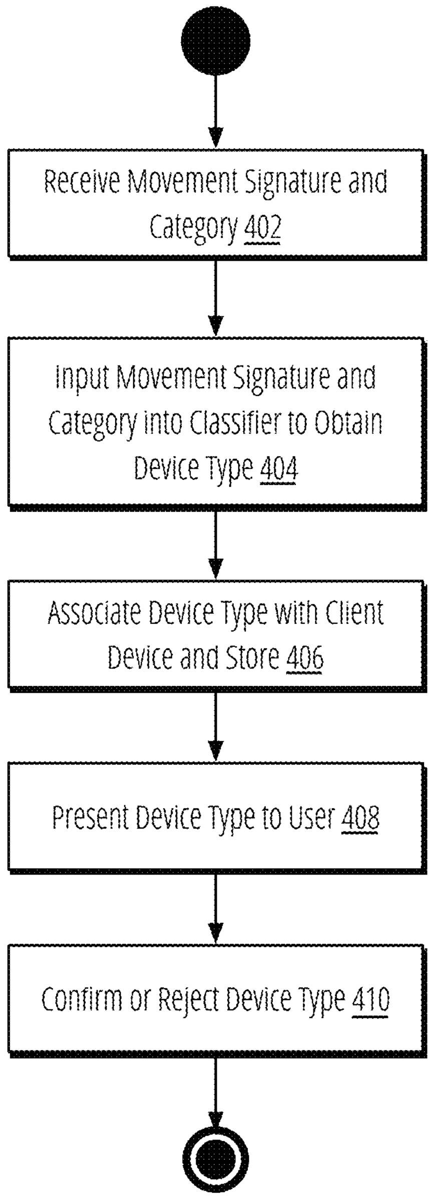
FIG. 4 is a flow diagram illustrating a method for identifying device type identification according to some of the example embodiments.

FIG. 4 is a flow diagram illustrating a method for identifying device type identification according to some of the example embodiments.

In step 402, the method can include receiving a movement signature and a category for a client device. In some implementations, the category may be optional.

As discussed, a movement signature is a representation of the client device's movement over a period of time, encapsulated into a format that is interpretable by a machine learning model or rule-based system. It's extracted from the collected WSD and can be a single vector, a sequence of vectors, or a complex multi-dimensional object, depending on the specifics of the feature engineering and signature generation steps. The category, when present, represents an overarching class or group that the client device belongs to. For instance, the category could be "smartphone", "laptop", or "IoT device". The use of categories provides a form of context and can help in refining the device typing process. However, this input is optional, and the method can function purely on the basis of the movement signature. In some implementations, as discussed, the category can be generated by classifying network data of the same client device. In some implementations, the WSD can be used to distinguish between models of devices within a general category and thus supplement the broader category of a device. For example, WSD data can be used to distinguish between chipsets of a category of device and thus be used to further categorize devices. As an example, the method can store a mapping of chipsets to device identifiers and then, upon identifying characteristics of a specific chipset, may further subcategorize a device model based on the identified chipset.

In step 404, the method can include inputting the movement signature and optional category in a classifier and obtaining a device type.

At a high level, the classifier operates by using the movement signature and the category (if present) to match the specific characteristics of the client device with a known device type. Regardless of the underlying mechanism, the classifier maps the input data (movement signature and optional category) to a device type. It matches the pattern embodied in the movement signature, and optionally the category, to a corresponding pattern in its knowledge base. This mapping process leverages the distinctive nature of the movement signature, allowing the classifier to make a fine-grained determination of the device type. The actual mechanism of the classifier can range from rule-based heuristics to ML models. In either case, the classifier generates an output that represents a prediction or classification of the device type based on the provided movement signature and category. This device type is a more precise identification than the category, allowing for a granular understanding of the specific device in use.

In a rule-based or heuristic system, predefined rules or conditions are applied to the movement signature and category to make a classification. These rules are generally designed based on expert knowledge or observations and they create associations between certain patterns or features in the input data and specific device types. For instance, one rule could specify that if a movement signature shows high frequency changes in RSSI values and the device category is identified as 'Home Appliances', the device could be classified as a 'Robotic Vacuum Cleaner'. This is based on the understanding that robotic vacuum cleaners often move around frequently in a given space, causing significant fluctuations in signal strength. Another rule might state that if the movement signature contains predominantly low-frequency variations in CSI values, indicating less movement, and the device category is identified as 'Entertainment', the device could be classified as a 'Smart Television'. This is predicated on the assumption that televisions are typically stationary and thus, their Wi-Fi sense data would reflect fewer movements. These heuristic rules could be if-then statements or they could be more complex, combining several features and conditions. Regardless, the rules essentially map the characteristics observed in the movement signature and category to a specific device type, providing a form of 'lookup' functionality for the classifier.

In a machine learning-based system, a trained model is employed to classify the device type based on the received movement signature and category. This model can be trained on large datasets that contain many examples of different device types, their associated movement signatures, and categories.

One example of this could be the use of a deep learning model, such as a CNN, which can identify patterns in spatial or temporal data, making it suitable for analyzing movement signatures. In this case, the model might learn to recognize specific patterns in the frequency or amplitude variations of the WSD that correspond to certain device types. For instance, a CNN might learn that certain irregular, high-frequency changes in RSSI values coupled with a device category of 'Fitness' tend to correspond to 'Smart Fitness Tracker'. Another example could be the use of an SVM. SVMs can be used for their ability to handle high-dimensional data, which is advantageous considering that a movement signature might be represented by a large number of features. If a movement signature consists of time-series data from various Wi-Fi sense parameters, an SVM could effectively discern the hyperplanes in this high-dimensional space that separate different device types. In both cases, these ML models function by learning the complex, non-linear relationships between the movement signatures and device types during the training phase. Then, during the operation phase, they use this learned knowledge to make predictions when presented with new movement signature and category data.

In step 406, the method can include associating the device type with the client device and storing the device type.

In some implementations, this step can include creating a link in the system's records or database between the device's unique identifier (such as its MAC address) and its determined type. This association provides a record of the device's identity and enables the system to recognize the device in future interactions. The method then proceeds to store this information for future reference. This could involve writing the device type into a local or remote database or file system that keeps track of all devices that have been typed. The record for each device may include its unique identifier, the assigned type, the corresponding movement signature, and optionally, the category. This stored information serves multiple purposes. It enables quick look-up of the device type during future interactions, reducing the need for repeated type determination. It also forms a historical record that could be used for reviewing and improving the system's performance over time. Furthermore, this stored information can be useful for maintaining a comprehensive inventory of all devices in the environment.

In step 408, the method can include presenting the device type to a user.

In the next step, the method includes presenting the determined device type to a user. This could be done in several ways, depending on the specifics of the system and the needs of the user. For instance, the device type could be displayed in a user interface, such as a web dashboard or a mobile application, that provides an overview of all devices in the environment. The presentation could include the device's unique identifier, the assigned type, and other relevant information. For example, if the device type suggests that the device is a particular model of a smart TV, the presentation could include this information along with details about the manufacturer, known specifications, and even potentially the location of the device if such data is available. In some implementations, the user may be able to interact with the presented information. For example, they may be able to sort or filter the list of devices by type, to search for a specific device, or to access additional details about a particular device. These interactive features can help users to manage and understand their device environment more effectively.

In step 410, the method can include confirming or rejecting the device type based on a response of the user. In some implementations, step 410 can further include generating updated training data based on the response.

The final step of the method includes receiving a confirmation or rejection of the device type from the user. This step capitalizes on the fact that users, who may have intimate knowledge about the devices in their network, can verify the accuracy of the device type determined by the system. In some embodiments, the user interface may provide options for the user to confirm that the determined device type is correct, or to reject it if it is incorrect. If the user rejects the determined type, they may be provided with options to select the correct type from a list, or to manually input the correct type.

The user's feedback can then be incorporated into the system. If the user confirms the type, this can serve as a validation of the system's accuracy. If the user rejects the type and provides the correct one, this can be used as a form of correction. Moreover, in certain implementations, the user feedback can be used to further improve the system's performance. The feedback data, consisting of the WSD, the movement signature, the (optional) category, and the user-confirmed device type, can be added to the training dataset. This enriched training dataset can then be used to retrain the classifier, improving its ability to correctly type devices in the future. In this way, the system learns and evolves from its interactions with users, continuously enhancing its performance over time.

Figure 5:
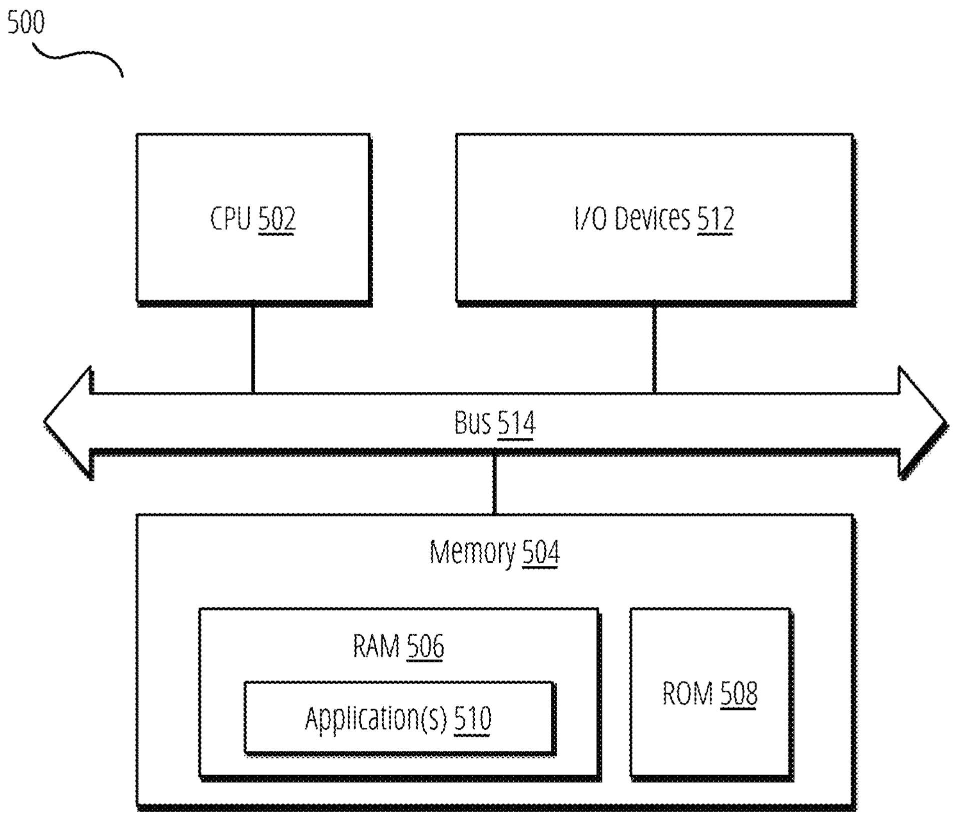
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple buses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

collecting, by a processor, Wi-Fi sense data (WSD) associated with a client device in a network, wherein the WSD includes wireless characteristics indicative of one of a movement or position of the client device;

generating, by the processor, a movement signature for the client device based on the WSD;

classifying, by the processor, a fine-grained type of the client device utilizing the movement signature; and storing, by the processor, the fine-grained type in a storage device.

2. The method of claim 1, wherein the WSD includes one or more of Channel State Information (CSI), Channel Frequency Response (CFR), Received Signal Strength Indicator (RSSI), and Time of Arrival (ToA).

3. The method of claim 1, further comprising capturing the WSD from communications between the client device and one or more access points in the network.

4. The method of claim 1, wherein generating the movement signature comprises applying a rule-based algorithm to the WSD.

5. The method of claim 1, wherein generating the movement signature comprises applying a machine learning algorithm to the WSD, the machine learning algorithm having been trained on a dataset comprising known movement signatures corresponding to different types of client devices.

6. The method of claim 1, wherein generating the movement signature comprises aggregating the WSD over a defined period of time to represent movements of the client device within the defined period of time.

7. The method of claim 1, wherein classifying the fine-grained type of the client device includes applying a set of predefined rules that correlate movement signatures to device types.

8. The method of claim 1, wherein classifying the fine-grained type of the client device includes using a machine learning model that has been trained on a dataset of known device types and their corresponding movement signatures to predict the fine-grained type based on the movement signature.

9. The method of claim 1, further comprising:

categorizing, by the processor, the client device into a category based on network traffic data; and utilizing, by the processor, the category in addition to the movement signature to classify the fine-grained type of the client device.

10. A non-transitory computer-readable storage medium for tangibly storing computer program instructions capable of being executed by a computer processor, the computer program instructions defining steps of:

collecting, by the computer processor, Wi-Fi sense data (WSD) associated with a client device in a network, wherein the WSD includes wireless characteristics indicative of one of a movement or position of the client device;

generating, by the computer processor, a movement signature for the client device based on the WSD;

classifying, by the computer processor, a fine-grained type of the client device utilizing the movement signature; and storing, by the computer processor, the fine-grained type in a storage device.

11. The non-transitory computer-readable storage medium of claim 10, wherein the WSD includes one or more of Channel State Information (CSI), Channel Frequency Response (CFR), Received Signal Strength Indicator (RSSI), and Time of Arrival (ToA).

12. The non-transitory computer-readable storage medium of claim 10, wherein generating the movement signature comprises one of applying a rule-based algorithm to the WSD or applying a machine learning algorithm to the WSD, the machine learning algorithm having been trained on a dataset comprising known movement signatures corresponding to different types of client devices.

13. The non-transitory computer-readable storage medium of claim 10, wherein generating the movement signature comprises aggregating the WSD over a defined period of time to represent movements of the client device within the defined period of time.

14. The non-transitory computer-readable storage medium of claim 10, wherein classifying the fine-grained type of the client device includes one of applying a set of predefined rules that correlate movement signatures to device types or using a machine learning model that has been trained on a dataset of known device types and their corresponding movement signatures to predict the fine-grained type based on the movement signature.

15. The non-transitory computer-readable storage medium of claim 10, further comprising:

categorizing the client device into a category based on network traffic data; and utilizing the category in addition to the movement signature to classify the fine-grained type of the client device.

16. The non-transitory computer-readable storage medium of claim 10, further comprising capturing the WSD from communications between the client device and one or more access points in the network.

17. A device comprising:

a processor; and a storage medium for tangibly storing thereon logic for execution by the processor, the logic comprising instructions for:

collecting Wi-Fi sense data (WSD) associated with a client device in a network, wherein the WSD includes wireless characteristics indicative of one of a movement or position of the client device, generating a movement signature for the client device based on the WSD, classifying a fine-grained type of the client device utilizing the movement signature, and storing the fine-grained type in a storage device.

18. The device of claim 17, wherein generating the movement signature comprises one of applying a rule-based algorithm to the WSD or applying a machine learning algorithm to the WSD, the machine learning algorithm having been trained on a dataset comprising known movement signatures corresponding to different types of client devices.

19. The device of claim 17, wherein classifying the fine-grained type of the client device includes one of applying a set of predefined rules that correlate movement signatures to device types or using a machine learning model that has been trained on a dataset of known device types and their corresponding movement signatures to predict the fine-grained type based on the movement signature.

20. The device of claim 17, the instructions further comprising:

categorizing the client device into a category based on network traffic data; and utilizing the category in addition to the movement signature to classify the fine-grained type of the client device.

* * * * *